US007066208B2

(12) United States Patent
Kort et al.

(10) Patent No.: US 7,066,208 B2
(45) Date of Patent: Jun. 27, 2006

(54) HYDRAULIC ACCUMULATOR

(75) Inventors: Armin Kort, Riegelsberg (DE); Herbert Baltes, Losheim (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 0 days.

(21) Appl. No.: 10/512,642

(22) PCT Filed: Apr. 30, 2003

(86) PCT No.: PCT/EP03/04499

§ 371 (c)(1), (2), (4) Date: Oct. 27, 2004

(87) PCT Pub. No.: WO2004/003392

PCT Pub. Date: Jan. 8, 2004

(65) Prior Publication Data

US 2005/0224122 A1 Oct. 13, 2005

(30) Foreign Application Priority Data

Jun. 27, 2002 (DE) ................................ 102 28 701

(51) Int. Cl.
*F16L 55/04* (2006.01)

(52) U.S. Cl. ............................ 138/31; 138/30; 138/26; 138/109

(58) Field of Classification Search .................. 138/31, 138/30, 26, 962, 109
See application file for complete search history.

(56) References Cited

U.S. PATENT DOCUMENTS

| | | | | |
|---|---|---|---|---|
| 2,461,132 | A | 2/1949 | Urschel | 220/610 |
| 2,748,801 | A * | 6/1956 | McCuistion | 138/31 |
| 2,774,619 | A * | 12/1956 | Mercier | 277/549 |
| 2,780,504 | A * | 2/1957 | Russell | 138/31 |
| 2,873,763 | A * | 2/1959 | Mercier | 138/31 |
| 3,142,318 | A * | 7/1964 | Mercier | 138/31 |
| 3,158,180 | A * | 11/1964 | Greer | 138/31 |
| 3,613,734 | A * | 10/1971 | Elmer | 138/31 |
| 3,863,677 | A * | 2/1975 | Tarsha | 138/31 |
| 5,031,664 | A * | 7/1991 | Alaze | 138/31 |
| 5,311,910 | A * | 5/1994 | Hasegawa et al. | 138/31 |
| 6,267,147 | B1 * | 7/2001 | Rago | 138/31 |
| 6,460,571 | B1 * | 10/2002 | Rajabi et al. | 138/31 |

FOREIGN PATENT DOCUMENTS

| | | |
|---|---|---|
| DE | 12 31 979 B | 1/1967 |
| EP | 0 078 031 A | 5/1983 |
| GB | 1 285 405 A | 8/1972 |

* cited by examiner

*Primary Examiner*—Patrick Brinson
(74) *Attorney, Agent, or Firm*—Roylance, Abrams, Berdo & Goodman, L.L.P.

(57) ABSTRACT

A hydraulic accumulator, particularly a piston-type accumulator, includes an accumulator housing (1) which defines a longitudinal axis (9), is provided with an opening that is concentric with the longitudinal axis (9) and is closed by means of a lid (11). The lid is secured in a form-fitting manner against axial forces by a wall portion (25) of the accumulator housing (1). The housing encompasses the lid and is radially deformed towards the inside. The hydraulic accumulator also includes at least one part (39) that is deformed perpendicular to the longitudinal axis (9) secure the lid (11) in a form-fitting manner against being twisted relative to the longitudinal axis (9).

13 Claims, 4 Drawing Sheets

HYDRAULIC ACCUMULATOR

FIELD OF THE INVENTION

The present invention relates to a hydraulic accumulator, a piston-type accumulator in particular, having an accumulator housing defining a longitudinal axis. The housing has at least one end an opening in the housing concentric with the longitudinal axis and closed by a cover. The cover is positively locked against the action of axial forces by a wall element of the accumulator housing surrounding the cover of the housing, and is deformed radially inward.

BACKGROUND OF THE INVENTION

Hydraulic accumulators with housing opening closed by a cover are available commercially and are widely used in conjunction with hydraulic systems. A hydraulic accumulator of this type, for example, is marketed by Parker Hydraulics under the trade name ACP Series Accumulator.

Hydraulic accumulators of this kind are characterized by comparatively low production costs, since the cover closing the accumulator housing through formation of positively locking engagement of cover and the part of the accumulator housing surrounding it may be fastened by simple and efficient means. Specifically, the wall surrounding the cover, in the case of the piston-type accumulator the respective cylindrical tube, is deformed by rolling so that an annular ring projecting inward is formed and is engaged in an associated annular groove in the circumference of the cover.

This type of fastening of one or both housing cover(s) of conventional hydraulic accumulators is advantageous from the viewpoint of simple and cost-effective manufacture. However, it nevertheless creates problems with respect to the operating properties, and leads to difficulties in installation of such accumulators. While the positive locking of the cover and the wall element of the accumulator housing surrounding it effected by deformation rolling does ensure axial retention of the cover involved, this cover may nevertheless be twisted when torque of a certain strength relative to the longitudinal axis occurs. This twisting results in problems, for example, when torque is applied to the respective cover as a result of the forces of tightening screw connections in installing such accumulators in a hydraulic system by screw connections joining the cover on the fluid side, for example, to the outlet of a hydraulic pump. Forces, such as vibrations which occur during operation, may also cause torsion of the cover relative to the accumulator housing.

SUMMARY OF THE INVENTION

Objects of the present invention are to provide a hydraulic accumulator which can be simply and cost-effectively produced and which has an improved connection of accumulator housing to housing cover.

These objects are basically attained in the case of a hydraulic accumulator of the type described above by at least one part of the opening in the housing and/or the cover, which is deformed transversely relative to the longitudinal axis and has a positive locking feature preventing torsion of the cover relative to the longitudinal axis.

The operating or installation problems indicated in the foregoing are eliminated in that the respective housing cover is, for the present invention, not only secured axially, but also is secured on the accumulator housing and/or cover against torsion by additional deformation transversely to the longitudinal axis. The additional deformation protects the cover against torque which is active between the cover and the accumulator housing. Such additional deformation required for protecting the cover against torsion may be performed without difficulty during manufacture, for example, by an additional pressure application or molding cycle, so that no significant increase in production costs is to be expected.

The protection against torsion may, for example, have a flattened area made in the circumferential annular surface of the respective cover and pressed into a wall element of the opening in the accumulator housing, for example, an end section of the cylindrical tube in the case of a piston-type accumulator.

The configuration may be such that several flattened areas are provided around the circumference of the cover. These flattened areas may be arranged so that they effect transition one into the other to form a polygonal shape.

In another optional configuration of the protection against torsion, a serration is provided on the circumference of the cover into which the wall of the opening in the accumulator housing may be pressed. The wall is the cylindrical tube in the case of a piston-type accumulator.

In another embodiment, a groove is made in the circumference of the respective cover to effect protection against torsion. This groove is threaded over the circumference relative to the longitudinal axis. A wall element of the opening in the accumulator housing projecting as a protuberance radially inward, the cylindrical tube, for example, may be pressed into this groove. Such an embodiment can be especially simple and cost-effective to produce. As is explained in greater detail in what follows, in addition to the rolling process for axial fastening, only one additional rolling or chasing tool need be employed over the circumference of the accumulator housing surrounding the cover. If the tool runs over the spiral groove which extends over an axial area of the cover on the basis of the thread pitch, a wall element extending inward as a protuberance is pressed into the spiral groove.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
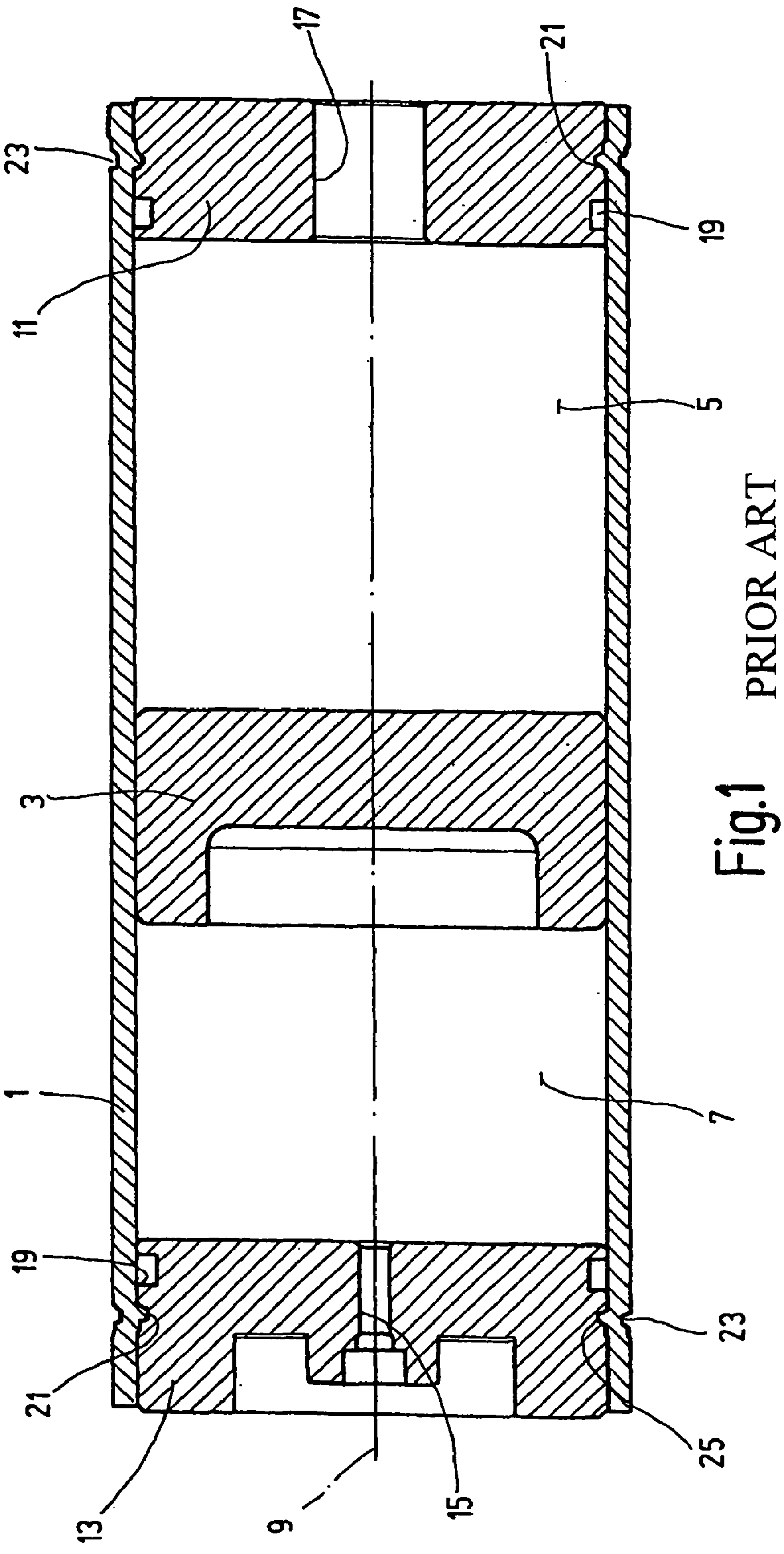
Fig.1 PRIOR ART
FIG. 1 shows a greatly simplified diagrammatic side elevational view in section of a conventional hydraulic accumulator configured as a piston-type accumulator.
Figure 3:
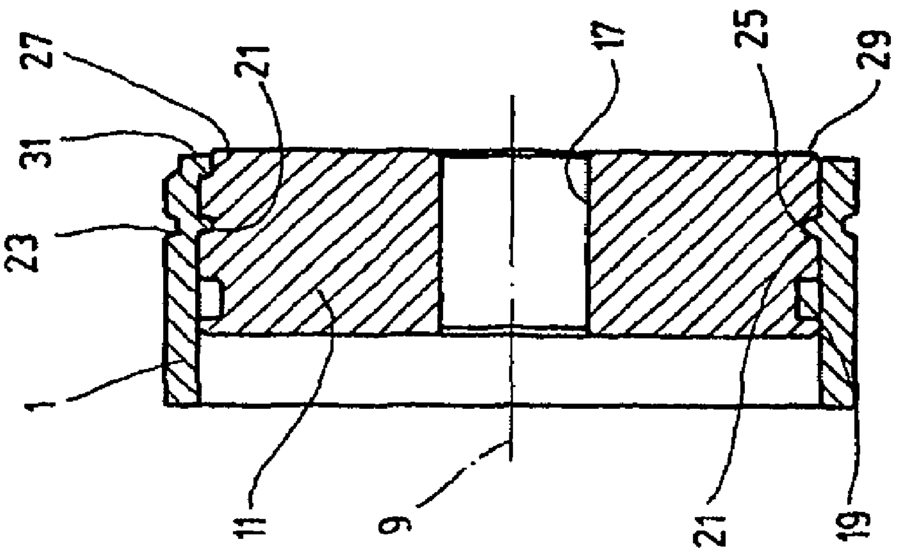
FIG. 3 a side elevational view in section of a hydraulic accumulator taken along line III—III of FIG. 2.
Figure 2:
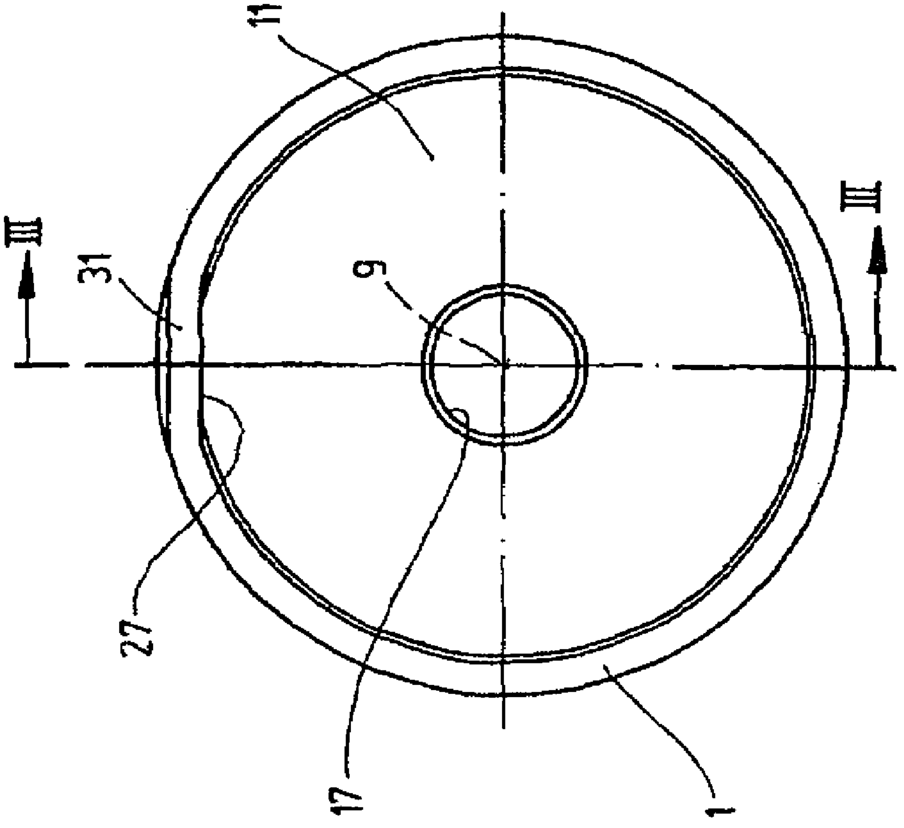
FIG. 2 a greatly simplified, diagrammatic front elevational view of the end on the fluid side of a hydraulic accumulator according to a first embodiment of the present invention in the form of a piston-type accumulator.
Figure 5:
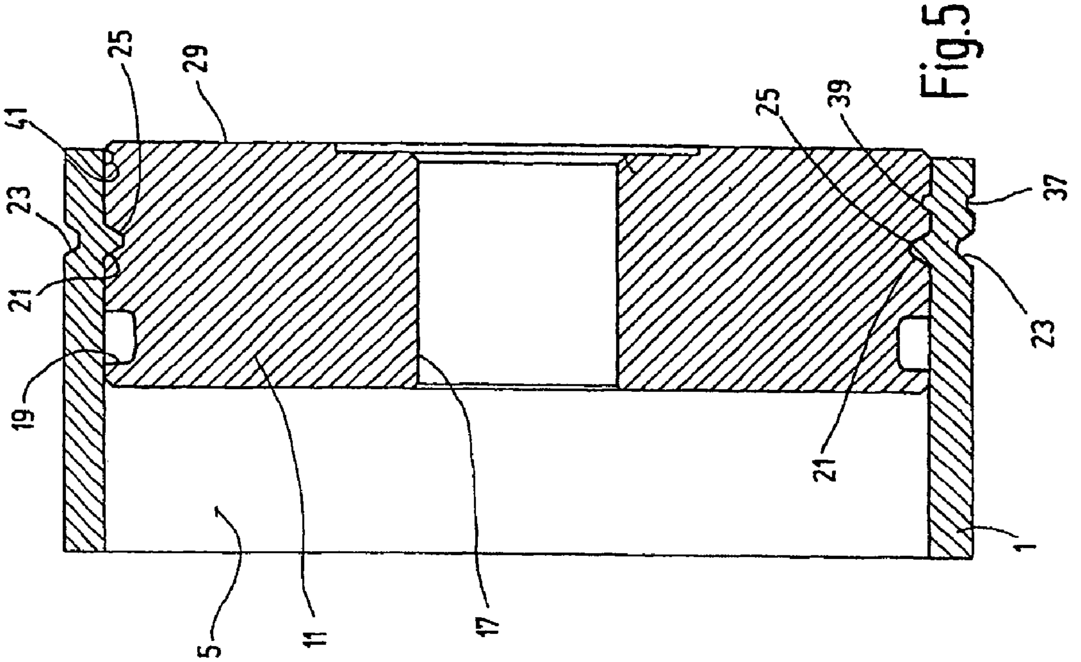
FIG. 5 is a side elevational view in section, on a scale smaller than that of FIG. 4, exclusively of the end area on the fluid side of the second embodiment of the hydraulic accumulator of the present invention, incorporating the built-in cover of FIG. 4.
Figure 4:
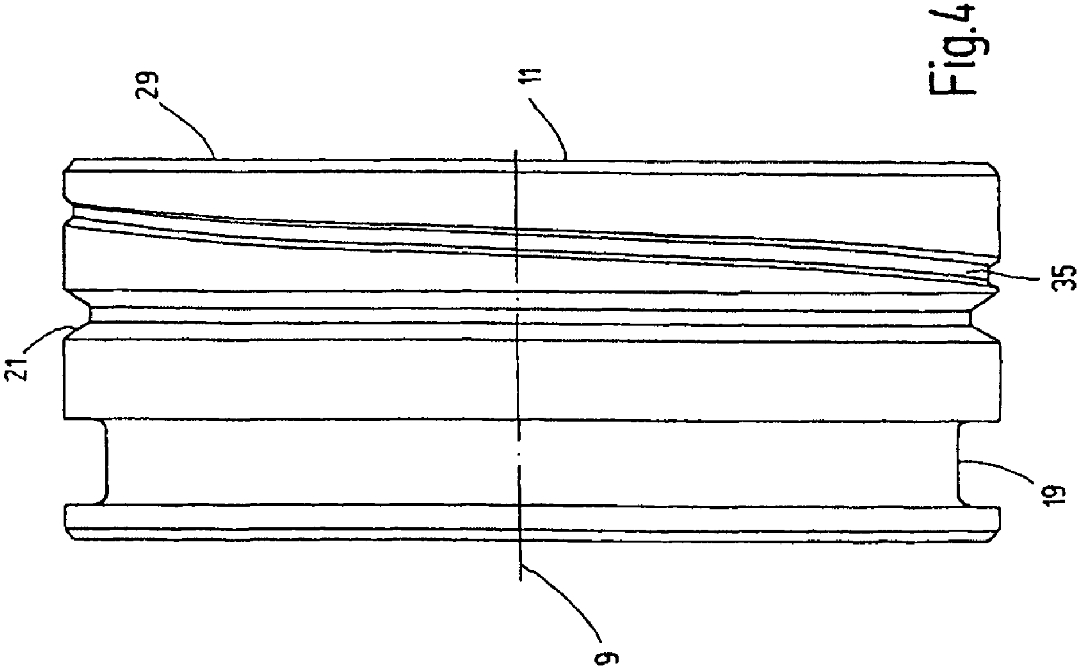
FIG. 4 a side elevational view, on a scale larger than that of FIGS. 1 to 3, of a housing cover for a hydraulic accumulator according to a second embodiment of the present invention.

For the sake of simplification of illustration, the relevant sealing elements employed for sealing between housing cover and accumulator housing are omitted from the drawings. FIG. 1 shows a piston-type accumulator of conventional design. FIGS. 2 and 3 illustrate a first exemplary embodiment of the hydraulic accumulator of the present invention. FIGS. 4 and 5 illustrate a second exemplary embodiment of the hydraulic accumulator claimed of the present invention.

All the embodiments illustrated represent piston-type accumulators. A cylindrical tube 1 is provided as accumulator housing. In the exemplary embodiments shown, the material provided for the cylindrical tube 1 is steel of a ductility suitable for deformation by pressing or rolling. The cylindrical tube 1 contains a piston 3, shown only in FIG. 1, as the element separating the fluid side 5 from the gas side 7 of the accumulator. The opening, concentric with the longitudinal axis 9, in the cylindrical tube 1, is closed at the end on the fluid side 5 by a round housing cover 11. On the gas side 7, the opening, concentric with the longitudinal axis 9, in the cylindrical tube 1 is closed on the end by a housing cover 13. The cover 13 has a central boring 15 for a gas valve. The cover 11 on the fluid side 5 also has a central boring 17 for connection to a hydraulic system.

Each cover 11, 13 has in its end area facing the piston 3 an annular retention groove 19 made in its circumference as seat for a sealing element not shown in the figures, an O-ring, for example. Another annular groove 21 is made in the circumference of the cover, axially offset from the annular groove 19 in the direction of the other end of the cover. This annular groove 21 serves to axially fasten the cover 11, 13 in the cylindrical tube 1. Positive engagement of cylindrical tube 1 and annular groove 21 is established by pressing in or rolling, in which an outer groove 23 is formed on the circumference of the cylindrical tube 1 as a result of which an annular bead 25 is formed which is engaged in the annular groove 21.

In the exemplary embodiment illustrated in FIGS. 2 and 3, the cover 11 has in its outer end area a flattened section 27, specifically on its axially outer end edge 29. The end section 31 of the cylindrical tube 1 oriented toward the flattened section 27 is pressed into this section. The cover 11 secured axially by engagement of the annular bead 25 in the annular groove 21, and is additionally secured at the flattened section 27 against torsion about the longitudinal axis 9.

In the exemplary embodiment illustrated in FIGS. 4 and 5, the cover 11 has, between the annular groove 21 and the axially outer end edge 29, another annular groove 35 extending in the form of a spiral, that is, a thread pitch, relative to the longitudinal axis 9. As is to be seen in FIG. 5, another groove 37 by which the wall material of the cylindrical tube 1 is pressed as a protuberance 39 into the spiral annular groove 35 is formed by a pressing or rolling process carried out on the cylindrical tube 1 in the axial section over which the spiral annular groove 35 extends. A protuberance 39 is formed in that an indentation is made not over the entire circumference of the cylindrical tube 1, but is exclusively in the area in which the pressing or rolling tool passes over the spiral annular groove 35. As a result, the protuberance 39 produced only at this point forms a discontinuity which acts as a lock on the protuberance to prevent torsion caused by the sloping surfaces adjacent to the thread pitch of the annular groove 35 on the protuberance 39. The part of the spiral annular groove 35 not containing the protuberance 39 remains clear, as is to be seen at 41, where the end of the annular groove 35 adjoining the end edge 29 is to be seen.

Figure 2A:
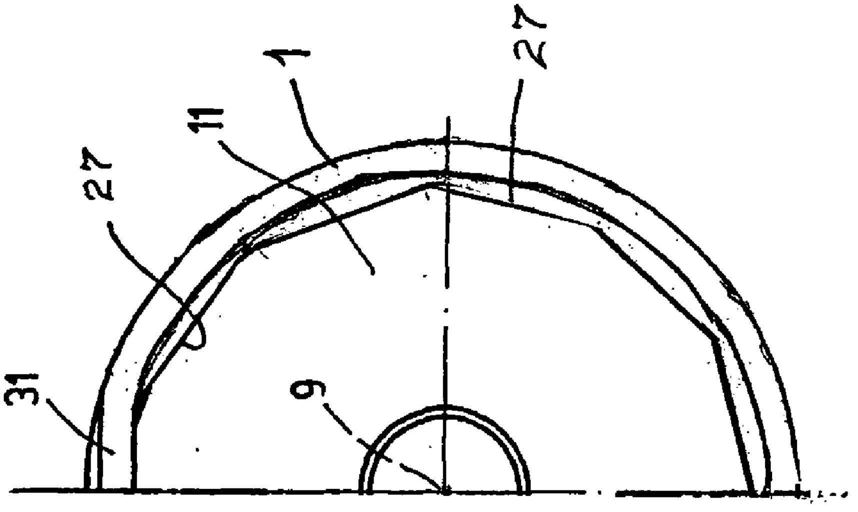
FIG. 2A is a greatly simplified, diagrammatic front elevational view of the end on the fluid side of a hydraulic accumulator according to a variation of the first embodiment.

Cogging, such as that in the form of knurling, may be provided on the respective cover in place of the two configurations of the protection against torsion illustrated in the drawing. Several flattened sections may also be provided on the circumference of the respective cover. Any shapes desired can be provided which result in a configuration other than a round one on the respective cover, such as one in the form of a polygon or serration as shown in FIG. 2A.

While various embodiments have been chosen to illustrate the invention, it will be understood by those skilled in the art that various changes and modifications can be made therein without departing from the scope of the invention as defined in the appended claims.

What is claimed is:

1. A hydraulic accumulator, comprising:

an accumular housing defining a longitudinal axis and having a first end with a first opening concentric with said longitudinal axis;

a first cover closing said opening in said housing;

an annular bead deformed and extending radially inwardly on said housing;

an annular retention groove in said cover receiving said bead to secure said cover positively in said housing against axial forces;

at least one flattened section on a circumferential annular surface of said cover; and a wall section of said housing being pressed against said flattened section and deformed transversely relative to said longitudinal axis to lock said cover in said housing against torsion about said longitudinal axis.

2. A hydraulic accumulator according to claim 1 wherein said housing comprises a cylindrical tube receiving a piston separating a gas side from a liquid side and being movable in said housing;

a second cover closes a second opening at a second end of said housing; and said first cover is on said liquid side.

3. A hydraulic accumulator according to claim 1 wherein said flattened area is in an area of an axially external edge of said cover; and an edge of said opening in said housing forms said wall section.

4. A hydraulic accumulator according to claim 3 wherein a plurality of flattened sections are distributed along said circumferential annular surface.

5. A hydraulic accumulator according to claim 4 wherein said flattened section transitions into one another to form a polygonal shape.

6. A hydraulic accumulator according to claim 1 wherein said cover has a circumferential annular sealing groove adjacent an inner axial edge seating a sealing element, said retention groove being between said sealing groove and said flattened section.

7. A hydraulic accumulator, comprising:

an accumular housing defining a longitudinal axis and having a first end with a first opening concentric with said longitudinal axis;

a first cover closing said opening in said housing;

an annular bead deformed and extending radially inwardly on said housing;

an annular retention groove in said cover receiving said bead to secure said cover positively in said housing against axial forces;

a serration on a circumferential annular surface of said cover; and a wall section of said housing being pressed against said serration and deformed transversely relative to said longitudinal axis to lock said cover in said housing against torsion about said longitudinal axis.

8. A hydraulic accumulator according to claim 7 wherein said housing comprises a cylindrical tube receiving a piston separating a gas side from a liquid side and being movable in said housing;

a second cover closes a second opening at a second end of said housing; and said first cover is on said liquid side.

9. A hydraulic accumulator according to claim 7 wherein said cover has a circumferential annular sealing groove adjacent an inner axial edge seating a sealing element, said retention groove being between said sealing groove and said serration.

10. A hydraulic accumulator, comprising:

an accumular housing defining a longitudinal axis and having a first end with a first opening concentric with said longitudinal axis;

a first cover closing said opening in said housing;

an annular bead deformed and extending radially inwardly on said housing;

an annular retention groove in said cover receiving said bead to secure said cover positively in said housing against axial forces;

a spiral groove extending along a thread pitch on a circumferential annular surface of said cover; and a wall section of said housing being pressed radially inwardly into said spiral groove and deformed transversely relative to said longitudinal axis to form protuberance to lock said cover in said housing against torsion about said longitudinal axis.

11. A hydraulic accumulator according to claim 10 wherein said housing comprises a cylindrical tube receiving a piston separating a gas side from a liquid side and being movable in said housing;

a second cover closes a second opening at a second end of said housing; and said first cover is on said liquid side.

12. A hydraulic accumulator according to claim 10 wherein said cover has a circumferential annular sealing groove adjacent an inner axial edge seating a sealing element, said retention groove being between said sealing groove and spiral groove.

13. A hydraulic accumulator according to claim 1 wherein said flattened section comprises a planar surface facing radially outwardly relative to said longitudinal axis.

* * * * *